United States Patent [19]
Walker et al.

[11] Patent Number: 4,654,173
[45] Date of Patent: Mar. 31, 1987

[54] NUCLEAR WASTE SOLUTIONS

[76] Inventors: Darrel D. Walker, 1684 Partridge Dr.; Martha A. Ebra, 129 Hasty Rd., both of Aiken, S.C. 29801

[21] Appl. No.: 800,588

[22] Filed: Nov. 21, 1985

[51] Int. Cl.[4] .......................... G21F 9/04; G21F 9/12; C09K 3/00

[52] U.S. Cl. .................................... 252/631; 210/682; 252/627; 423/2; 423/49; 423/50

[58] Field of Search ............... 252/631, 627, 626, 632, 252/635; 423/2, 6, 7, 12, 22, 49, 50; 210/682, 295; 204/1.5, 105 R, 109; 424/1.1

[56] References Cited

U.S. PATENT DOCUMENTS

| | | | |
|---|---|---|---|
| 3,890,244 | 6/1975 | Carlin et al. | 252/631 |
| 3,891,741 | 6/1975 | Carlin et al. | 252/631 |
| 4,156,646 | 5/1979 | Schulz | 252/631 |
| 4,176,158 | 11/1979 | Laidler et al. | 210/682 |
| 4,432,893 | 2/1984 | Lee et al. | 252/631 |

FOREIGN PATENT DOCUMENTS

| | | | |
|---|---|---|---|
| 0162533 | 9/1983 | Japan | 252/631 |

OTHER PUBLICATIONS

Proceedings of the International Seminar on Chemistry and Process Engineering for High-Level Liquid Waste Solidification, Julich, F. R. Germany, Jun. 1981, R. Odoj and E. Merz, Editors, 8 pages.

*Primary Examiner*—Stephen J. Lechert, Jr.
*Assistant Examiner*—Howard J. Locker
*Attorney, Agent, or Firm*—Allen F. Westerdahl; Judson R. Hightower

[57] ABSTRACT

High efficiency removal of technetium values from a nuclear waste stream is achieved by addition to the waste stream of a precipitant contributing tetraphenylphosphonium cation, such that a substantial portion of the technetium values are precipitated as an insoluble pertechnetate salt.

10 Claims, 2 Drawing Figures

NUCLEAR WASTE SOLUTIONS

The U.S. Government has rights in this invention pursuant to a contract between the U.S. Department of Energy (D.O.E.) and E. I. DuPont de Nemours & Co.

BACKGROUND OF THE INVENTION

The present invention relates to a process for removing technetium from solutions comprising water soluble nuclear waste salts.

Many tens of millions of gallons of high level liquid nuclear waste, in the form of a salt solution containing water-soluble radioactive salts, have accumulated over the past 28 years of operation at the Savannah River Plant, D.O.E., the primary source in the United States for special nuclear materials used in defense, aerospace and medical applications. (Other D.O.E. facilities have similar accumulations.) The radioactivity of the Savannah River salt solution is about 4 Ci/gallon, more than 99% of which is contributed by cesium-137. The remaining radioactivity is from strontium-90, ruthenium-106, plutonium and other isotopes, including technetium-99 (Tc-99) present as the pertechnetate anion ($TcO_4^-$). The salt solution is stored in carbon steel waste tanks which are unacceptable for permanent storage.

It is desirable to decontaminate the radioactive salt solution and solidify it in a concrete material called "saltstone." A precipitation-adsorption process to decontaminate a salt solution of the sort described above is disclosed in U.S. Pat. No. 4,432,893 (hereinafter "Lee et al"), the contents of which are incorporated herein by reference. In the disclosed process, the major radioactive components of the salt solution, cesium-137, strontium-90 and plutonium, are removed by contacting the radioactive waste solution simultaneously with sufficient sodium tetraphenylborate to precipitate the cesium, and with sufficient sodium titanate to adsorb the strontium and plutonium. The solids can then be separated (for example, by cross-flow filtration) from the decontaminated salt solution, wherein Tc-99 remains as the predominant long-lived radionuclide.

Technetium has a half-life of $2.13\times10^5$ years but does not occur naturally. Technetium-99 is a potential corrosion inhibitor and catalyst for chemical reactions such as hydrocarbon cracking and reforming. However, its use has not been implemented at least in part because Tc-99 is not available in large quantities. The recovery of Tc-99 from aqueous nuclear waste streams is the only source of significant quantities of technetium.

A method for recovering Tc-99 from such waste streams is disclosed by U.S. Pat. No. 3,890,244. In the disclosed method, the acidic waste solution comprising technetium is mixed with an alkaline earth metal oxide or hydroxided flocculant, forming a precipitate and a technetium-containing supernatant phase. After the supernatant is separated from the precipitate and acidified with mineral acid, the technetium is electrolytically removed as an elemental deposit on the cathode of an electrolytic cell.

Technetium removal by the combined use of solvent extraction and electrolysis, as taught in the above-summarized U.S. patent, is a complex process, requiring sophisticated equipment that is difficult to maintain and repair in the context of operating a radioactive system. An alternative method for recovering Tc-99 values from a waste stream is disclosed by Forberg and Westermark in Proc. Int'l. Seminar Chem. & Proc. Eng'rg High-level Liquid Waste Solidification (R. Odvj & E. Merz eds. 1981). The disclosed method entails adding a ferrous salt to a dimethylamine-neutralized, technetium-containing feed solution previously subjected to sorption over a titanate ion exchanger. More specifically, technetium activity in effluent from the titanate ion exchanger is scavenged by the addition of the ferrous salt, followed by precipitation of the hydroxide. This ferrous salt reduction/precipitation approach has the advantage of simplicity, but it cannot be used with the high-pH waste streams (typical pH of about 12 to 14) generated by systems like the Savannah River Plant, apparently because of the lowered reducing potential of ferrous ion at high pH.

Refosco et al, Inorganica Chimica Acta 64:L205 (1982), disclose a method for recovering Tc-99, as $[AsPh_4]TcO_4$, from laboratory wastes by treating aqueous waste solutions with a saturated solution of tetraphenylarsonium chloride; recovery was reported to be nearly quantitative. However, the high cost of the arsonium salt employed by Refosco et al, and the toxicity of the arsenic-containing pertechetate precipitate they obtained, represent substantial drawbacks to adapting the disclosed method to the processing of large amounts of high level liquid nuclear wastes. In addition, the concentration of technetium in the laboratory waste solutions treated by Refosco et al (approximately $7\times10^{-3}$M) was substantially higher than that normally encountered in D.O.E. salt solutions (average Tc-99 concentration about $6\times10^{-5}$M).

SUMMARY OF THE INVENTION

It is therefore an object of the present invention to provide a method for the removal of technetium from nuclear waste streams by a process that is comparatively simple to implement and that generates insoluble technetium in a form which is not highly toxic.

It is also an object of the present invention to provide a method for recovering Tc-99 values at high efficiency from low technetium-content, high pH waste streams which are characteristic of effluent from radioactive systems like the Savannah River Plant.

In accomplishing the foregoing objects, there has been provided, in accordance with one aspect of the present invention, a process for the removal of technetium values from a nuclear waste solution which contains Tc-99, comprising the steps of (1) contacting the solution with a precipitating agent that contributes to the solution an amount of tetraphenylphosphonium cation sufficient to precipitate at least a portion of the technetium values out of the waste solution as an insoluble pertechnetate salt precipitate and then (2) separating the pertechnetate salt precipitate from the waste solution. In a preferred embodiment, the precipitating agent used in the aforesaid process comprises at least one compound selected from the group consisting of tetraphenylphosphonium chloride and tetraphenylphosphonium hydoxide.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

For the purposes of this specification the acronyms TPP and TPP+ are intended as abbreviations for tetraphenylphosphonium ion.

DETAILED DESCRIPTION OF THE PREFERRED EMBODIMENT

Figure 1:
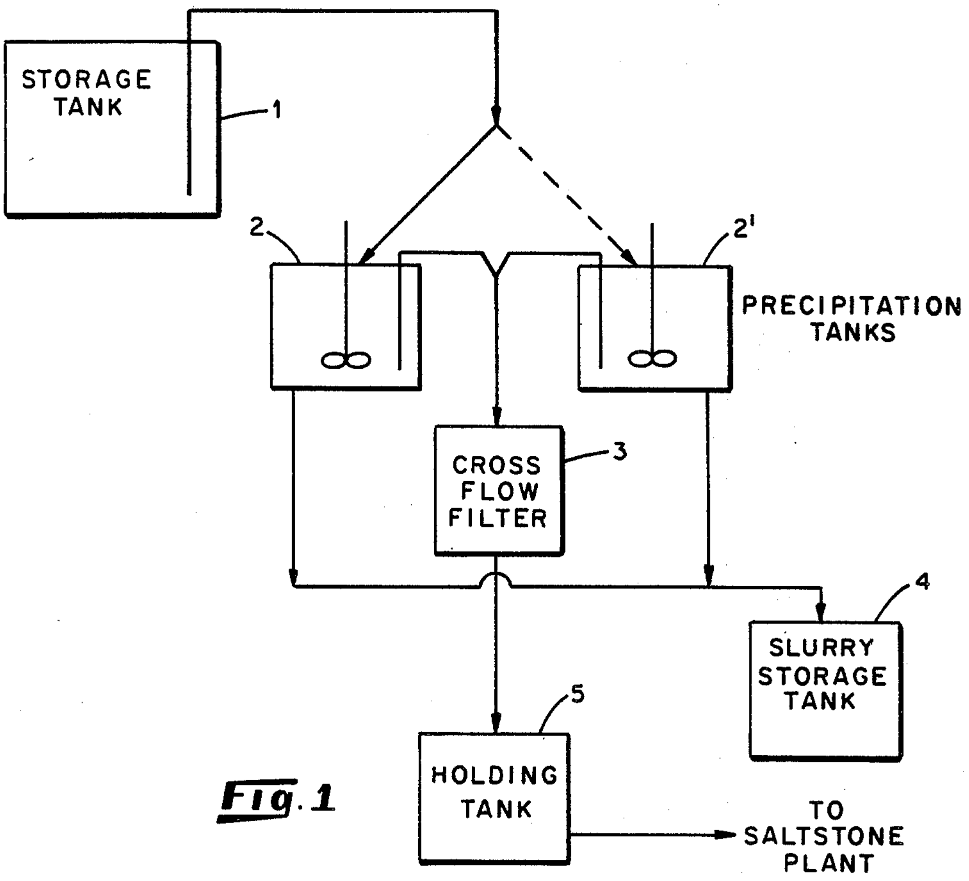
FIG. 1 is a schematic representation of a batch-processing system for removing technetium from waste solution in accordance with the present invention.

A number of large cations, including Tl+, AG+, Ca+, nitron [4,5-dihydro-2,4-diphenyl-5-(phenylimino)-1,2,4-triazole] and $(C_6H_5)_4As^+$, form precipitates with pertechnetate anion that are insoluble, or only slightly soluble, in aqueous solution. But solubility correlations, based on a common anion, between compounds comprising different cations are notoriously erratic. Accordingly it cannot be predicted a priori whether a given cation complex with the pertechnetate anion will be sufficiently insoluble to be useful in a process for removing technetium as described above, particularly when technetium is present in concentrations typical of the Savannah River Plant salt solution, i.e., in the range of about $2.5\times10^{-5}$ to $1\times10^{-4}$M (average of about $6\times10^{-5}$M) or approximately 35–200 mCi per liter of waste solution.

It was surprising, therefore, to discover that tetraphenylphosphonium ion (TPP+) not only forms a pertechnetate salt which is essentially insoluble in aqueous solution, but also that precipitation of the pertechnetate-phosphonium complex could be effected even under conditions of high pH and/or low Tc-99 content that are characteristic of a waste salt solution like that produced by the Savannah River Plant.

More specifically, in simulated waste solutions containing $3\times10^{-5}$M pertechnetate (see Table 1), the addition of $4.2\times10^{-4}$M tetraphenylphosphonium chloride (TPPCl) resulted in the precipitation of approximately 96% of the pertechnetate, providing a decontamination factor (DP) of 30, where DF is defined as the ratio of technetium activity measured before precipitation to that measured after precipitation.

TABLE 1

COMPOSITION OF SIMULATED SALT SOLUTION

| Component | Concentration (molar) |
|---|---|
| $Na^+$ | 5.6 |
| $K^+$ | .015 |
| $NO_3^-$ | 2.3 |
| $NO_2^-$ | .70 |
| $OH^-$ (free) | 1.3 |
| $CO_3^{2-}$ | .20 |
| $AlO_2^-$ | .38 |
| $SO_4^{2-}$ | .17 |
| $F^-$ | .017 |
| $Cl^-$ | .025 |
| $SiO_3^{2-}$ | .0045 |
| $CrO_4^{2-}$ | .0039 |
| $MoO_4^{2-}$ | .00051 |
| $C_2O_4^{2-}$ (oxalate) | .029 |
| $PO_4^{3-}$ | .012 |
| $TPB^-$ (tetraphenylborate) | .001 |
| $TcO_4^-$ | $3.0\times10^{-5}$ |

It was found that the DF for the simulated waste solutions was directly dependent on the amount of TPPCl added. A DF of 10, for example, required 0.053 grams of TPPCl per liter of waste solution. As described below, the DF values obtained with actual waste solutions (see Table 2) were somewhat lower than those achived with simulated solutions. Thus, to obtain a 90% removal of technetium required the addition of 0.29 grams of TPPCl per liter of actual waste solution.

TABLE 2

AVERAGE COMPOSITION OF DECONTAMINATED SALT SOLUTION

| Major Non-Radioactive Components | | Major Radioactive Components | |
|---|---|---|---|
| Component | Concentration (molar) | Radionuclide | Concentration (mCi/l) |
| $Na^+$ | 5.0 | Tc-99 | 50 |
| $NO_3^-$ | 2.0 | Ru-106 | 50 |
| $OH^-$ | 1.2 | Cs-137 | 25 |
| $NO_2^-$ | .62 | Sr-90 | .9 |
| $AlO_2^-$ | .34 | I-129 | .25 |
| $CO_3^{2-}$ | .15 | | |
| $SO_4^{2-}$ | .023 | | |
| $F^-$ | .015 | | |
| $PO_4^{3-}$ | .011 | | |
| $TPB^-$ (tetraphenylborate) | .002 | | |

Preferably, technetium precipitation by addition of TPP+ in accordance with the present invention is accomplished in a batch process. An exemplary arrangement for batch processing of a waste stream to remove Tc-99 using the present invention is shown schematically in FIG. 1. Typically, waste solution from which cesium-137 and strontium-90 has been removed via the process disclosed by Lee et al is pumped from a storage tank 1, first to one of two or more precipitation tanks 2 and then, alternatively, to the other tank(s). For a system comprising two precipitation tanks, as shown in FIG. 1, the cycle of alternatively filling the tanks could extend, for example, over about eight hours. After the first tank has been filled, and while filling of the second tank is in progress, a batch precipitation of Tc-99 is carried out by addition of a water soluble tetraphenylphosphonium salt, such as a soluble TPP halide salt (e.g., TPP chloride, TPP bromide and TPP fluoride) or TPP hydroxide, to the solution in the first tank. The resulting slurry of pertechnetate precipitate is then separated for further processing, as elaborated below, and the procedure repeated in the other tank(s) in succession.

A precipitation process within the present invention is now described in greater detail, with reference to a batch processing setup as shown in FIG. 1;

(1) Actual waste solution, preferably partially decontaminated by the removal of cesium and strontium, is fed into a precipitation tank (2) which could contain, for example, some 7,200 gallons of solution based on an instantaneous processing rate of 15 gallons per minute. (The "instantaneous processing rate" corresponds to the maximum rate achieveable at any given time; the average processing rate, which includes downtime, might be the range of about 10 gallons per minute over an entire year.)

(2) A water soluble potassium salt is then optionally added to precipitate tetraphenylborate (TPB) ion present by virtue of a prior addition of sodium tetraphenylborate in accordance with Lee et al. A 45% KOH solution (11 molar) is suitable for this purpose, with about two gallons of the 11M solution required per 720 gallons of the waste solution shown in Table 2. When the KOH and waste solutions are thoroughly mixed over a period of about one-half hour, precipitation of potassium tetraphenylborate (KTPB) is rapid and no additional time for ripening of the crystals comprising the precipitate is required to obtain crystals of a size amenable to easy filtering.

(3) $TPP^+$ is then added in the form of an aqueous concentrate of a water soluble tetraphenylphosphonium compound. TPPCl is preferred in this regard, but other soluble TPP compounds, such as tetraphenylphosphonium hydroxide, can be used, for example, if elimination of chloride is necessary to ameliorate corrosion. After addition of $TPP^+$ to a concentration preferably in the range of about $7\times10^{-4}$M to $2\times10^{-3}$M, the batch solution is agitated for about one-half hour or more in the tank to assure complete mixing of the solution and precipitation of the phosphonium complex. The batch can be sampled at this stage and analyzed for technetium content. If the DF value thus determined is too low, more $TPP^+$-contributing precipitating agent can be added. For the above-mentioned preferred range of $TPP^+$ concentration, the corresponding range for DF is between about 10 and 130.

If preliminary decontamination in accordance with Lee et al is not carried out, and precipitation (2) of TPB ion therefore not effected, somewhat smaller phosphonium crystals may be obtained. If TPB ion is present, filtration of the resulting KTPB precipitate formed in step (2) is not required, as the presence of KTPB actually enhances technetium recovery in the present invention, presumably by aiding in the filtration of tetraphenylphosphonium pertechnetate ($TPPTcO_4$). For reasons not fully understood, the efficiency of technetium removal is also improved if the concentration of the initial salt solution, as reflected by sodium ion content, is adjusted (e.g., by allowing water to evaporate during storage) to a level higher than 5.6M sodium ion, preferably up to about 7M sodium. In addition, the volume of the $TPPTcO_4$ precipitate obtained is reduced by up to 40% or more by carrying out step (3) at the higher salt concentration.

The pertechnetate precipitate, which forms as a slurry at the bottom of the precipitation tank, can be removed and concentrated for easier storage. Preferably, concentration of the precipitate is accomplished by cross-flow filtration, as disclosed by Martin et al, "Intank Precipitation Process for Decontamination of Water Soluble Radioactive Waste" in 1 Waste Management '84 291 (Univ. Arizona 1984), the contents of which are incorporated herein by reference. In the setup shown in FIG. 1, cross-flow filtration is carried out by pumping the pertechnetate slurry through a sintered metal pipe (3), such that filtered waste solution "weeps" through the sintered metal and leaves the slurry behind. The dewatered slurry is returned to the tank and recycled back through the pipe until the slurry is concentrated to about 10–15% solids (approximately 35 to 50 gallons for a 7200-gallon batch).

From the original waste solution to a concentrated slurry of about 10% solids, the overall concentration factor for technetium, using cross-filtration, is about 155:1. Higher concentrations are possible with other methods, such as bed filtration or centrifugation, that allow for greater removal of water. But cross-flow filtration requires no moving parts aside from the pump components, and hence offers the advantages of operational simplicity and reliability.

After the pertechnetate slurry has been sufficiently concentrated, it can be retained in a slurry storage tank 4, from which the slurry is transferred periodically to another facility for incorporation into glass or for further recovery processing. The filtered waste solution is collected from the sintered metal pipe 3 and retained in a holding tank 5; it can be transferred from there to a saltstone disposal facility.

Figure 2:
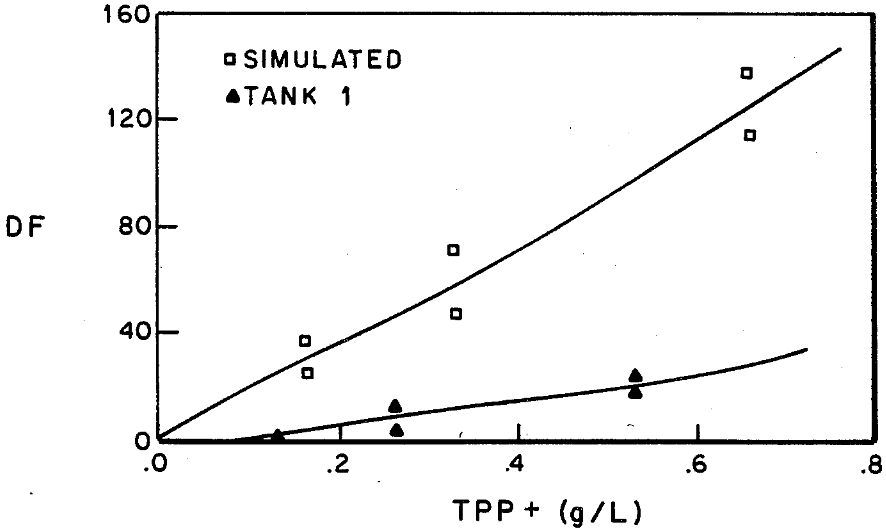
FIG. 2 is a graph showing the relationship between decontamination factor (DF), defined below, and tetraphenylphosphonium ion concentration for simulated and actual waste solutions treated in accordance with the present invention.

As noted above, both simulated and actual waste solutions were processed, in accordance with the present invention, to remove Tc-99 by the addition of $TPP^+$. More specifically, 10 ml aliquots of waste solution, simulated or actual, were each placed in 25 ml polyethylene containers. To each container, a sufficient amount (approximately 0.1 ml) of 0.32M KOH solution was added to precipitate TPB ion after thorough agitation over several seconds. About 0.05 ml of TPPCl solution (0.088M) was then added to each container; the containers were capped and shaken for one hour. The resulting slurry in each container was filtered through a cellulose filter (0.2 micron nominal pore size), and the filtrate was analyzed for technetium by a standard scintillation counting method. The observed DF values for Tc-99 at differing $TPP^+$ concentrations are shown, for both simulated and actual waste solutions, in FIG. 2.

The present invention permits the high efficiency precipitation, from relatively Tc-poor, caustic waste streams, of technetium in a form that is non-toxic and easily stored.

What is claimed is:

1. A process for the removal of technetium values from a nuclear waste solution which contains an initial, Tc-99, concentration in the range of about $2.5\times10^{-5}$ to $1\times10^{-4}$ molar, comprising the steps of (1) contacting said solution with a precipitation agent that contributes to said solution an amount of tetraphenylphosphonium cation sufficient to precipitate at least a portion of said technetium values out of said waste solution as an insoluble pertechnetate salt precipitate and then (2) separating said pertechnetate salt precipitate from said waste solution.

2. A process according to claim 1, wherein said precipitating agent comprises a water soluble tetraphenylphosphonium salt.

3. A process according to claim 2, wherein said salt is a water soluble tetraphenylphosphonium halide salt.

4. A process according to claim 2, wherein said precipitating agent comprises at least one compound selected from the group consisting of tetraphenylphosphonium chloride and tetraphenylphosphonium hydroxide.

5. A process according to claim 1, wherein said portion of said technetium values precipitated out of said waste solution ranges between at least 90% and about 96%.

6. A process according to claim 1, wherein step (2) comprises removing said pertechnetate salt precipitate from said waste solution by filtering.

7. A process according to claim 1, wherein said waste solution has a sodium ion concentration of at least 5.6 molar.

8. A process according to claim 1, further comprising prior to step (2) the step of concentrating said precipitate.

9. A process according to claim 8, wherein concentration of said precipitate is effected by cross-flow filtration.

10. A process according to claim 1, wherein said amount of tetraphenylphosphonium cation is between about $7\times10^{-4}$ and $2\times10^{-3}$ molar.

* * * * *